March 5, 1946. E. C. CORK 2,395,851
APPARATUS FOR MEASURING HIGH FREQUENCY VOLTAGES
Filed May 10, 1943
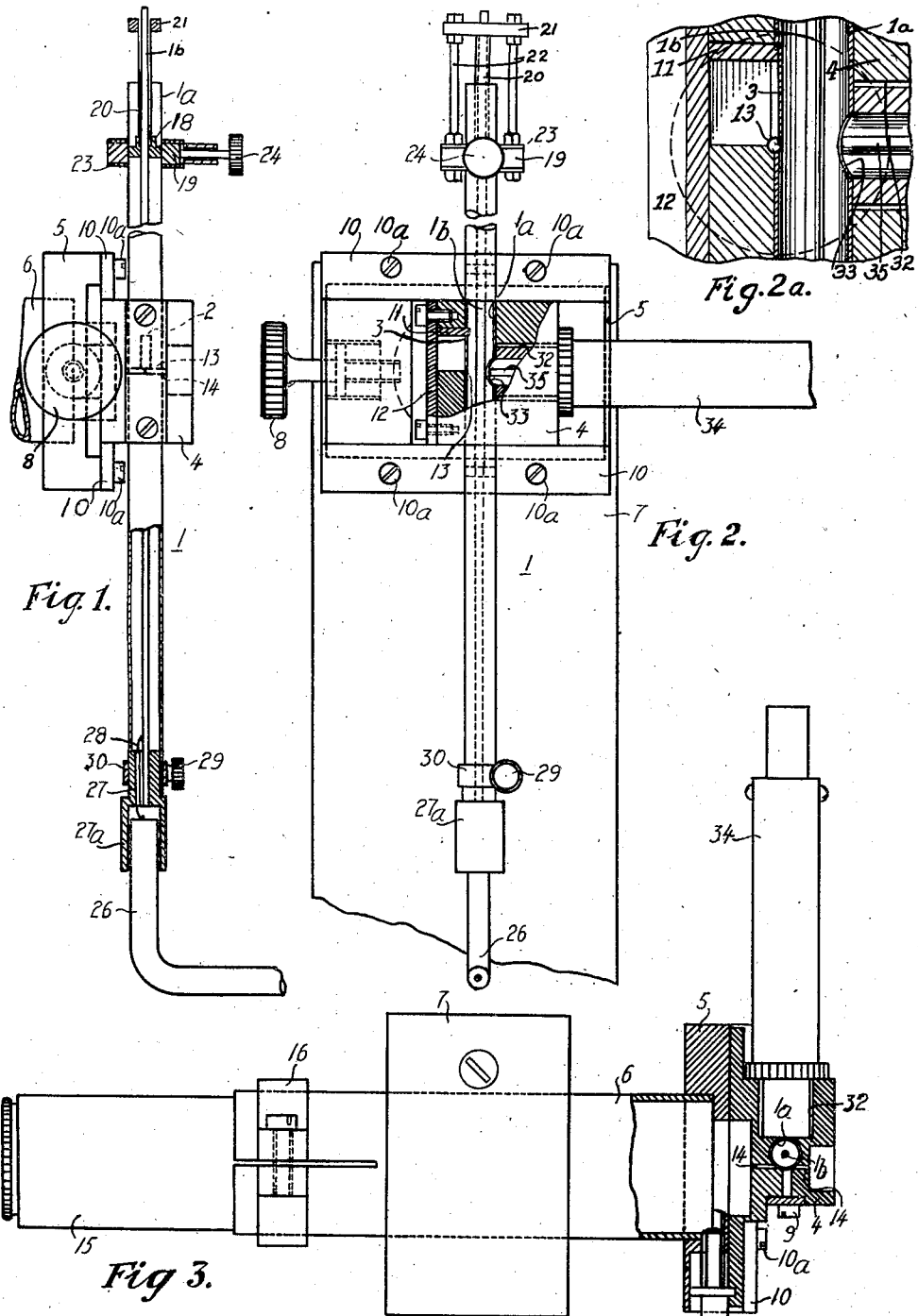
INVENTOR
Edward C. Cork
by H. C. Grover
ATTORNEY Patented Mar. 5, 1946

2,395,851

UNITED STATES PATENT OFFICE 2,395,851

APPARATUS FOR MEASURING HIGH-FREQUENCY VOLTAGES

Edward Cecil Cork, Ealing, London, England, assignor to Electric & Musical Industries Limited, Hayes, Middlesex, England, a company of Great Britain Application May 10, 1943, Serial No. 486,418
In Great Britain September 25, 1941

7 Claims. (Cl. 171—95)

This invention relates to apparatus for measuring high frequency alternating electric voltages.

When it is desired to measure the voltage, current or power of a high-frequency circuit, it is found that considerable difficulty arises owing to the fact that conventional measuring instruments are unreliable at high frequencies and also owing to the disturbing effects on the circuit due to the introduction of such conventional measuring instruments.

The object of the present invention is to provide an improved apparatus whereby very high frequency voltages, such as voltages having frequencies of the order of 3000 megacycles, can be readily measured without the disadvantages mentioned above.

The apparatus, according to the invention, comprises a pair of conductors forming a high frequency transmission line and a conducting leaf electrically connected at said high frequency to one of said conductors so that if an alternating voltage to be measured is developed between said conductors the leaf will be deflected to an extent depending on the amplitude of the voltage in the region of said leaf. The deflection of the leaf is proportional to the square of said amplitude. The deflection may be calibrated by causing a known potential difference to be established between the conductors of the line. Preferably the transmission line is of the co-axial type, the leaf being preferably connected to the outer conductor of the line and suspended in an aperture therein.

It may be found, at very high frequencies, such as at frequencies corresponding to centimetre wavelengths, that the deflection of the leaf is only a fraction of a millimetre, in which case the deflection of the leaf is preferably observed through a microscope.

The device, according to the invention, is particularly suitable for the calibration of crystal detectors.

In order that the said invention may be clearly understood and readily carried into effect, the same will now be more fully described with reference to the accompanying drawing, in which:

Figure 1 is a side elevational view of a voltmeter arrangement embodying the invention, Figure 2 is a front elevational view of the apparatus shown in Figure 1, while Figure 2a is an enlarged sectional view of a portion of Figure 2, and Figure 3 is a top plan view of the apparatus shown in Figures 1 and 2 with certain items not fully represented in Figures 1 and 2 represented completely.

In all the figures of the drawing, parts have been represented as broken away to show the interior construction.

The apparatus illustrated comprises a length of co-axial transmission line 1 comprising outer and inner conductors 1a and 1b, which is vertically arranged. The line 1 is provided with a longitudinal slit in the outer conductor thereof, the slit being represented in dotted lines at 2 in Figure 1, and suspended in the slit on a horizontal axis is a leaf 3 (see Figures 2 and 2a), preferably made of gold and which is electrically connected to the outer conductor 1a of the line 1. The outer conductor 1a of the transmission line is carried in a supporting metal block 4 which may be mounted in a slide 5 carried on the end of a sleeve 6 which is mounted on a vertical pillar 7 (see Figures 2 and 3), which projects from a suitable base (not shown). The supporting block 4 is coupled to a screw 8 by means of which the block 4 can be adjusted transversely of the pillar 7. The transmission line may be held in the block 4 by a set screw 9 (see Figure 3) and the block 4 is retained in the slide 5 by plates 10 suitably secured on the slide, for example, by screws 10a. The leaf 3 may be carried by an arm 11 projecting from a plate 12 attached to the block 4, for example, by screws, and in electrical contact therewith. A transverse hole 13 is provided in the outer conductor 1a of the transmission line 1 in the vicinity of the lower end of the leaf 3 through which the displacement of the leaf can be observed and an aperture 14 (see Figures 1 and 3) is provided in said block in line with the hole 13 for the admission of light. Since, at very high frequencies the displacement of the leaf 3 may be only a fraction of a millimetre, it is preferred to observe the displacement of the leaf through a microscope, the eye-piece of which is shown at 15 in Figure 3, the microscope being housed in the sleeve 6 and adjustably clamped therein by means of a clamping ring 16 embracing a saw-cut portion of the sleeve 6. The microscope 15 is preferably so mounted in the sleeve 6, for example, in an eccentric mounting, that the microscope is capable of adjustment within the sleeve 6 to enable the microscope to be appropriately disposed for viewing the leaf 3. A graduated transparent scale may be provided in the microscope objective or elsewhere in the optical system to enable the extent of displacement of the leaf to be ascertained.

The upper end of the concentric line 1 is provided with an adjustable short-circuiting collar or piston 18 (see Figure 1) contacting with the inner surface of the outer conductor and the exterior surface of the inner conductor whereby the tuning of the transmission line 1 can be adjusted to enable a maximum voltage to exist in the region of the leaf 3. The piston 18 may be constructed in any suitable manner, but is preferably made according to any of the constructions described in the specification of a co-pending patent application by H. E. Holman et al., Serial No. 504,744, filed October 2, 1943. Surrounding the piston and moving therewith on the exterior surface of the outer conductor of the line there is provided a clamping collar 19 whereby the piston can be maintained in good electrical contact with both the inner and outer conductors of the line 1. The piston 18 may be carried by a sleeve 20 surrounding the inner conductor 1b of the line 1 and the sleeve 20 may project beyond the extremity of the outer conductor where it is connected to a cross-bar 21 in turn connected by suitable rods 22 (see Figure 2) to a support 23 (see Figure 1) carrying the clamping collar 19. The arrangement is such that by loosening the clamping collar 19 by releasing the screw 24, the piston 18 and the clamping means can be adjusted to any appropriate position for tuning purposes.

The voltage to be measured may be applied to the transmission line from its lower end and for this purpose a suitable concentric cable 26 is fitted to the lower end of the concentric line, the outer conductor of the concentric cable being in electrical contact with the outer conductor of the transmission line and the inner conductor of the cable in contact with the inner conductor of the line. The lower end of the transmission line may be provided with an adjustable short-circuiting collar or piston 27 (see Figure 1) contacting with the inner surface of the outer conductor of the line and the outer surface of the inner conductor, the piston 27 having a skirt 27a projecting beyond the lower end of the transmission line and formed so as to be connected to the outer conductor of the cable. The inner conductor of the cable may, as shown at 28 in Figure 1, pass through a bore in the piston and be suitably connected to the inner conductor 1b of the transmission line above the upper end of the piston. The position of the piston 27 within the transmission line is capable of adjustment for impedance matching purposes. In the example shown the piston 27 can be clamped in position by tightening screw 29 in clamping ring 30 embracing the transmission line 1. The inner conductor of the cable 26 may be connected to the inner conductor 1b of the line at a distance from the leaf 3 approximately equal to a quarter or three-quarters of the wavelength of the voltage to be measured.

Preferably the effective length of the transmission line 1 and the connecting cable 26 between the point at which the leaf 3 is mounted and the point at which the cable is connected in the transmission line carrying the voltage to be measured, is adjusted to be an integral multiple of a half wavelength so that the voltmeter arrangement produces the minimum of disturbance in the circuit being investigated.

Apparatus in accordance with the invention has the advantage that owing to the inevitable inertia of the leaf the deflection of the leaf by high frequency voltages is related to the R. M. S. value of the amplitude of the high-frequency voltage developed between the conductors of the transmission line in the vicinity of the leaf in substantially the same way as the deflection of the leaf is related to the value of a steady voltage applied between the conductors. Thus providing the gold leaf is directly electrically connected to one conductor the apparatus can readily be calibrated for the measurement of high-frequency voltages by observing the deflection of the leaf with a series of steady voltages between the conductors of the transmission line. The apparatus is thus suitable for use as a standard for the calibration of other measuring devices, such as crystal detectors, and means may be provided whereby the device to be calibrated can be suitably mounted at a position relatively to the transmission line where the voltage which causes deflection of the leaf 3 is set up. Where a crystal or the like is to be calibrated, the crystal or like holder is connected to a probe which can be mounted in capacitative relationship with the inner conductor of the transmission line. For this purpose one side of the block 4 may be provided with a threaded aperture as shown as 32 in Figures 2, 2a and 3 and concentric with the aperture a hole 33 (see Figures 2 and 2a) is provided in the outer conductor 1a of the transmission line 1 in the vicinity of the leaf 3 and opposite the longitudinal slit 2 in the outer conductor. The crystal or like holder, shown at 34 in Figures 2, 2a and 3 may be threaded into the threaded aperture and when in position the probe thereof, shown at 35 in Figures 2 and 2a, will project through the hole 33 in the transmission line whereby the probe is in capacitative relationship with the inner conductor 1b of the transmission line. Thus, the voltage which causes deflection of the leaf 3 is also applied by the capacity coupling to the crystal or other device to be calibrated.

An appropriate size for the leaf for measuring voltages of a frequency corresponding to a wavelength of nine cms. is seven millimetres long and one millimetre wide. The leaf is preferably suspended as nearly as possible in line with the inner surface of the outer conductors to avoid undue local variations of the impedance of the transmission line, the longitudinal slit in the outer conductor, of course, being made of an appropriate length and width to permit free movement of the leaf. The invention is, of course, not limited in its application to voltages of the wavelength mentioned above, since it is generally applicable to the measurement of longer wavelengths where conventional measuring apparatus is not suitable and to much shorter wavelengths even where the wavelengths are comparable to the dimensions of the leaf.

The apparatus according to the invention can, of course, be readily employed to determine the current flowing along a transmission line and can also be employed for the determination of a high frequency power in the circuit by measuring both the current flow in and the voltage across the circuit.

If desired, a short section of a transmission line can be employed having said leaf mounted thereon and designed so that it can be readily coupled to an installed transmission line whereby the absolute voltage at any point can be readily measured.

What I claim is:

1. Apparatus for measuring high-frequency alternating electric voltages comprising a pair of conductors forming a high-frequency transmission line and a conducting leaf electrically connected at said high-frequency to one of said conductors and so arranged that if an alternating voltage to be measured is developed between said conductors, said leaf will be deflected to an extent depending on the amplitude of the voltage in the region of said leaf thereby affording an indication of the magnitude of said amplitude.

2. Apparatus according to claim 1, wherein said transmission line is of the co-axial conductor type, said leaf being connected to the outer conductor of the line and being suspended in an aperture therein.

3. Apparatus for measuring high frequency alternating electric voltages comprising a pair of conductors forming a high frequency transmission line and a conducting leaf electrically connected at said high frequency to one of said conductors and so suspended therefrom that said leaf is deflected to an extent depending on the amplitude of the high frequency alternating voltages developed across said transmission line, said transmission line being provided with tuning means adapted to be so positioned that the amplitude of the voltage developed in the vicinity of said leaf by a high frequency wave on said line can be caused to be a maximum.

4. Apparatus for measuring high frequency alternating electric voltages comprising a pair of conductors forming a high frequency transmission line and a conducting leaf electrically connected at said high frequency to one of said conductors and so suspended therefrom that said leaf is deflected to an extent depending on the amplitude of the high frequency alternating voltages developed across said transmission line, said transmission line being arranged to be short-circuited at a distance equal to one quarter of the operating wavelength from the position of said leaf, whereby the amplitude of the voltage developed in the vicinity of said leaf by a high frequency wave on said line may be caused to be a maximum.

5. Apparatus for measuring high frequency alternating electric voltages comprising a pair of conductors forming a high frequency transmission line and a conducting leaf electrically connected at said high frequency to one of said conductors and so suspended therefrom that said leaf is deflected to an extent depending on the amplitude of the high frequency alternating voltages developed across said transmission line, and means for mounting a potential responsive device which is required to be calibrated in such proximity to said conducting leaf that the voltage which produces the deflection of said leaf is applied to said potential responsive device.

6. Apparatus for measuring high frequency alternating electric voltages comprising a pair of conductors forming the inner conductor and outer shell of a coaxial high frequency transmission line, said outer shell having an aperture therein, a conducting leaf electrically connected at said high frequency at one end to said outer shell and so arranged as to be suspended in said aperture, whereby said leaf is deflected to an extent depending on the amplitude of the high frequency alternating voltages developed across said transmission line.

7. Apparatus according to claim 6 wherein a microscope is so associated with said conducting leaf that its deflection may be observed.

EDWARD CECIL CORK.